United States Patent
Murray et al.

(10) Patent No.: US 11,890,574 B2
(45) Date of Patent: Feb. 6, 2024

(54) SYSTEM AND METHOD FOR PROCESS GAS RECAPTURE FOR EMISSION RECOVERY

(71) Applicant: WeldFit LLC, Houston, TX (US)

(72) Inventors: Adam Scott Murray, McKinney, TX (US); Eric Heinle, Conroe, TX (US); Jack A. Smith, Seguin, TX (US); William Stratton, Austin, TX (US)

(73) Assignee: WELDFIT LLC, Houston, TX (US)

( * ) Notice: Subject to any disclaimer, the term of this patent is extended or adjusted under 35 U.S.C. 154(b) by 0 days.

(21) Appl. No.: 17/841,375

(22) Filed: Jun. 15, 2022

(65) Prior Publication Data

US 2022/0314165 A1 Oct. 6, 2022

Related U.S. Application Data

(63) Continuation of application No. PCT/US2022/023357, filed on Apr. 4, 2022.
(Continued)

(51) Int. Cl.
*B01F 23/21* (2022.01)
*B01D 53/78* (2006.01)
(Continued)

(52) U.S. Cl.
CPC .............. *B01D 53/78* (2013.01); *B01D 50/00* (2013.01); *B01D 53/346* (2013.01); *B01D 53/75* (2013.01);
(Continued)

(58) Field of Classification Search
CPC ......... B01F 23/21; B01F 23/214; B01D 50/00
See application file for complete search history.

(56) References Cited

U.S. PATENT DOCUMENTS

| | | | |
|---|---|---|---|
| 2005/0092594 A1 | 5/2005 | Parro et al. | |
| 2018/0318750 A1 | 11/2018 | Zhong et al. | |
| 2021/0069635 A1 | 3/2021 | Skomurski et al. | |

FOREIGN PATENT DOCUMENTS

| | | |
|---|---|---|
| CN | 107051076 B | 8/2017 |
| KR | 102208575 B1 * | 1/2021 |

OTHER PUBLICATIONS

International Search Report and Written Opinion for Application No. PCT/US22/23357, dated Jun. 21, 2022, 7 pages.

\* cited by examiner

*Primary Examiner* — Robert A Hopkins
(74) *Attorney, Agent, or Firm* — William R. Childs; Childs Patent Law PLLC

(57) ABSTRACT

A system and method recover process gas from a source volume at a source pressure to a destination volume at an equal or greater pressure. A regulation process receive the process gas from the source volume and steps down the pressure. Each regulation uses one or more stage each using a pressure control valve for pressure step down and a heat exchanger for reheating the process gas thereafter. A gas scrubber receives the process gas from the regulation stages and collecting liquid from the process gas. A compression process receives the process gas from the gas scrubber and steps up the intermediate pressure to a final pressure. The compression can use one or more compression stages, each having a compression cycle for pressure step up and a heat exchanger for cooling the process gas thereafter. A discharge vessel receives the process gas from the compression process and discharges the process gas at the final pressure to the destination volume. The final pressure is equal to or greater than the destination pressure.

30 Claims, 4 Drawing Sheets

Related U.S. Application Data

(60) Provisional application No. 63/170,704, filed on Apr. 5, 2021.

(51) Int. Cl.
  *B01D 53/75* (2006.01)
  *B01D 53/34* (2006.01)
  *B01D 50/00* (2022.01)

(52) U.S. Cl.
  CPC ........ *B01F 23/21* (2022.01); *B01D 2259/124* (2013.01)

SYSTEM AND METHOD FOR PROCESS GAS RECAPTURE FOR EMISSION RECOVERY

CROSS-REFERENCE TO RELATED APPLICATIONS

This application is a continuation and claims priority to PCT Application No. PCT/US22/23357 filed on Apr. 4, 2022, entitled "SYSTEM AND METHOD FOR PROCESS GAS RECAPTURE FOR EMISSION RECOVERY" which claims priority to U.S. Provisional Application No. 63/170,704, filed on Apr. 5, 2021, entitled "SYSTEM AND METHOD FOR PROCESS GAS RECAPTURE FOR EMISSION RECOVERY," the entirety of which are incorporated by reference.

BACKGROUND OF THE DISCLOSURE

Pipeline and vessel operations frequently require emptying an isolated volume that contains natural gas at high pressure. For example, when pigging operations are completed, the volume of gas left in the pig launcher or receiver needs to be emptied. Other pipeline and vessel operations, such as maintenance, filter replacement, and the like, also require emptying gas from an isolated volume. In many instances, the high pressure gas cannot be directly evacuated back into the adjacent pipeline system, which is at an equal or greater pressure. Therefore, a common practice for empty the volume of gas involves either venting the gas to the atmosphere or burning the gas during release through flaring. Understandably, a technique that can recapture the gas from the isolated volume and can reintroduce that recapture gas into the adjacent pipeline system is preferred.

To that end, the subject matter of the present disclosure is directed to overcoming, or at least reducing the effects of, one or more of the problems set forth above.

SUMMARY OF THE DISCLOSURE

A system is disclosed herein for recovering a process gas from a first volume at a first pressure to a second volume at an equal or greater pressure. The system comprises:
one or more regulation stages receiving the process gas from the first volume at the first pressure and configured to step down the first pressure to an intermediate pressure, each of the one or more regulation stages comprising a pressure control valve to step-down pressure of the process gas and a heat exchanger to heat the process gas thereafter;
a gas scrubbing stage receiving the process gas from the one or more regulation stages and collecting liquid from the process gas;
one or more compression stages receiving the process gas from the gas scrubbing stage and configured to step-up the intermediate pressure to a final pressure, each of the one or more compression stages comprising a compression cycle to step-up pressure of the process gas and a heat exchanger to cool the process gas thereafter; and
a discharge stage receiving the process gas from the one or more compression stages and configured to discharge the process gas at the final pressure to the second volume at the second pressure, the final pressure being equal to or greater than the second pressure.

The gas scrubbing stage further comprises a blowcase connected to a gas scrubber and receiving the collected liquid, the blowcase connected to the process gas as a source pressure boosting the liquid to a liquid outlet.

The gas scrubbing stage further comprises one or more tanks buffering expansion of the process gas from a gas scrubber and draining liquid therefrom to a liquid outlet.

In the system, each of the one or more compression stages comprises a pressure safety valve disposed upstream of the heat exchanger and configured to release the process gas above a pressure threshold to a gas outlet, the pressure threshold for each of the one or more compression stages increasing from one of the compression cycles to the next.

In the system, each of the one or more compression stages comprises a demister disposed downstream from the heat exchanger and configured to remove lubricant oil from the process gas.

A method is disclosed herein for recovering a process gas from a first volume at a first pressure to a second volume at an equal or greater pressure. The method comprises:
receiving the process gas from the first volume at the first pressure;
bringing the process gas down from the first pressure to an intermediate staged pressure below the first pressure by stepping the process gas down from the first pressure through one or more pressure control valves and reheating the process gas after being stepped down;
scrubbing liquid from the stepped-down process gas;
bringing the processes gas up from the intermediate staged pressure to a final staged pressure by stepping the process gas up through one or more compression cycles and cooling the process gas after being compressed in each of the one or more compression cycles; and
discharging the process gas at the final staged pressure to the second volume, the final staged pressure being equal to or greater than the second pressure.

In bringing the processes gas down from the first pressure to the initial staged pressure below the first pressure, the method comprises measuring a first temperature of the process gas after being stepped down, reheating the process gas with a heat exchanger based on the first temperature; measuring a second temperature of the process gas after reheating; and verifying the reheating of the process gas based on a comparison between the first and second temperatures.

In bringing the processes gas down from the first pressure to the initial staged pressure below the first pressure, the method comprises measuring a first pressure of the process gas before being stepped down; measuring a second pressure of the process gas after being stepped down; and verifying the stepdown of the process gas based a comparison between the first and second pressures.

In the method, scrubbing the liquid from the process gas at the initial staged pressure comprises communicating the liquid to a blowcase; boosting the liquid from the blowcase using the process gas as a source pressure; and draining the boosted liquid from a liquid outlet.

In the method, stepping the process gas down from the initial staged pressure to the intermediate staged pressure below the initial staged pressure comprises buffering expansion of the process gas in one or more tanks; and draining liquid from the buffered process gas.

In the method, stepping the process gas down from the initial staged pressure to the intermediate staged pressure below the initial staged pressure comprises stepping the process gas down through a pressure control valve between a scrubber and one or more buffer tanks.

In the method, bringing the processes gas up from the intermediate staged pressure to the final staged pressure by stepping the process gas up through one or more compression cycles and cooling the process gas after being compressed comprises:

compressing the process gas in a first of the one or more compression cycles; measuring a first staged pressure of the process gas after compression; expelling the process gas above a first threshold pressure; and cooling the process gas with an intercooler; and compressing the process gas in at least one subsequent of the one or more compression cycles; measuring a subsequent staged pressure of the process gas after compression; expelling the process gas above a subsequent threshold pressure; and cooling the process gas with an intercooler.

In the method, compressing the process gas comprises demisting the process gas of lubricant oil after cooling.

In the method, discharging the process gas at the final staged pressure to the second volume comprises collecting the process gas in a discharge vessel; and draining any liquid from the process gas.

In the method, discharging the process gas at the final staged pressure to the second volume comprises communicating the discharge vessel with the scrubber to prime the scrubbing process.

The foregoing summary is not intended to summarize each potential embodiment or every aspect of the present disclosure.

DETAILED DESCRIPTION OF THE DISCLOSURE

Figure 1:
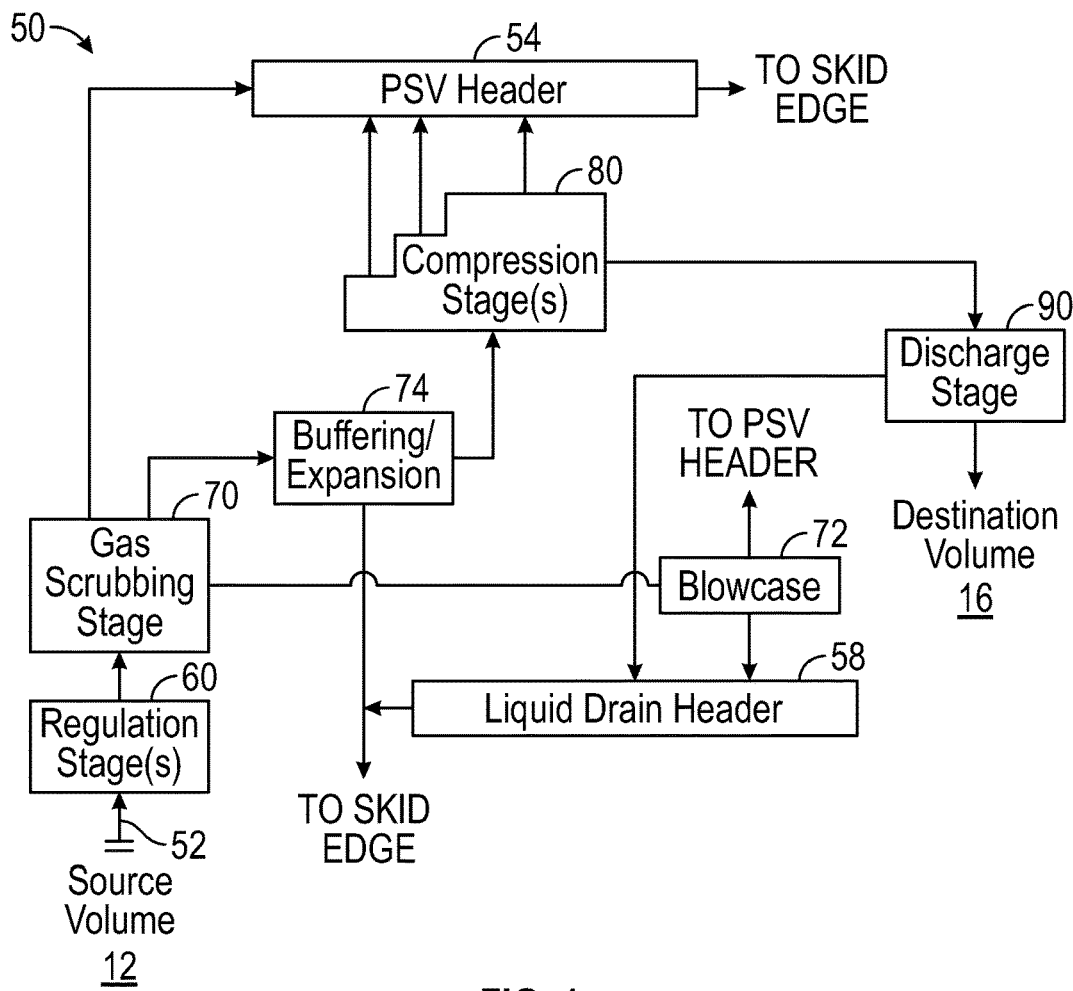
FIG. 1 illustrates a gas transfer system according to an embodiment of the present disclosure.

FIG. 1 illustrates a gas transfer system 50 of the present disclosure used for depressurization and recovery of gas to reduce the need for voluntary venting or flaring of a process gas, such as natural gas, methane, etc., associated with blowdowns during pipeline operations. The gas transfer system 50 transfers the gas contents from a high-pressure volume (12) to an adjacent high-pressure volume (16) that is at an equal or greater pressure. In general, the system 50 depressurizes and captures gas from an isolated section of pipeline or pressure-containing vessel and re-pressurizes the gas for discharge directly into an adjacent pressurized system. Accordingly, each of the volumes (12, 16) can be any separate volume, such as a section of a gas pipeline, a vessel, or the like. In one particular configuration, the first volume (12) can be that of a pig launcher or receiver, while the second volume (16) can be section of a pipeline or another vessel.

The transfer process performed by the gas transfer system 50 can reduce emission of harmful gases to the atmosphere that may otherwise need to be flared or vented during a conventional blow-down process. In this way, the system 50 and the gas transfer process disclosed herein can reclaim the gas in the source volume (12) and place it in the destination volume (16) while avoiding detrimental environmental effects.

The system 50 includes one or more decompression or regulation stages 60, a gas scrubbing stage 70, one or more compression stages 80, and a discharge stage 90. An inlet of the one or more regulation stages 60 receives the process gas from the source volume (12) at the source pressure. The regulation stages 60 are configured to step down the source pressure to an intermediate pressure. As discussed below, each of the regulation stages 60 includes a pressure regulating device for pressure step down and includes a heat exchanger for reheating the process gas thereafter.

The gas scrubbing stage 70 receives the process gas from the regulation stages 60 and collects liquid from the process gas. To handle the collected liquid, a blowcase 72 can be used so the liquid can be boosted to a liquid drain header 58 having a liquid outlet. The blowcase 72 connected to the gas scrubbing stage 70 receives the collected liquid, and a gas pressure source (not shown) boosts the liquid to the liquid outlet of the header 58. Additionally, a buffer and expansion stage 74 can buffer the expansion of the process gas as part of the scrubbing stage 70 and can allow liquid to drain to the liquid outlet of the liquid drain header 58.

The one or more compression stages 80 receive the process gas from the gas scrubbing stage 70. The stages 80 are configured to step-up the intermediate pressure to a final pressure. Each of the compression stages 80 includes a compression cycle for pressure step-up and includes a heat exchanger for cooling the process gas thereafter. In each of the compression stages 80, a pressure control valve can be configured to release the process gas above a pressure threshold to a gas header 54. The pressure threshold for each of the compression stages 80 increases from one compression cycle to the next. In the compression stages 80, a demister can be used to remove lubricant oil for the compression from the process gas.

The discharge stage 90 receives the process gas from the one or more compression stages 80 and is configured to discharge the process gas at the final pressure to the second volume (16). The final pressure is at or above the pressure of the destination volume (16). If necessary, the discharge stage 90 can also be used to discharge any collected liquid to the liquid drain header 58. In general, depending on the implementation, the system 50 may or may not include the blowcase 72 and the buffering and expansion stage 74.

Figure 2:
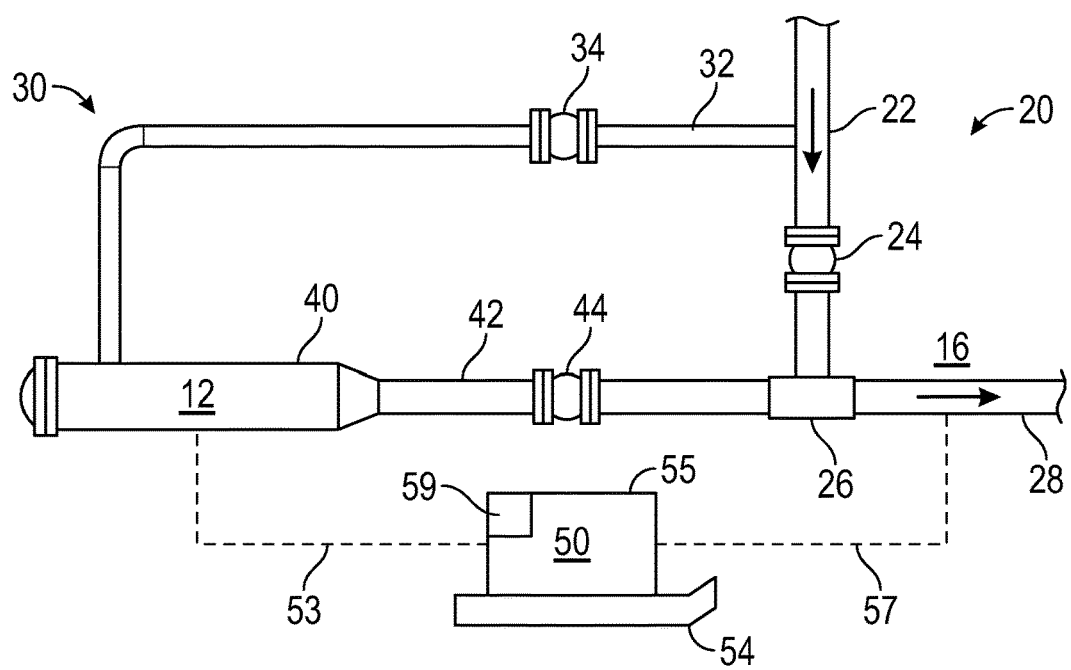
FIG. 2 illustrates an example implementation in which the gas transfer system can be used.

As shown in FIG. 2, the equipment of the system 50 can be packaged into a single, compact unit 55. For example, the equipment of the system 50 can be housed inside a weatherproof enclosure, which can be mounted on a skid 54 to facilitate mobile transport. A suction line 53 of the system 50 can connect to the source volume (12), which can be a pig launcher, receiver, vessel, piping, or other isolated pressure containing system. A discharge line 57 of the system 50 can connect to the destination volume (16), which can be piping or other destination. The connection lines 53, 57 can use flexible hoses, piping, tubing, or the like depending on the implementation.

In the example of FIG. 2, the system 50 is used to depressurize and recapture process gas from the isolated volume (12) of a pig launcher 40 of a pigging system 30. The gas transfer system 100 re-pressurizes the process gas for discharge directly into the adjacent piping system 20 to which the pigging system 30 is connected.

As shown in a simplified way, the piping system 20 has a mainline 22 with a bypass valve 24 connecting to a flow tee 26. During normal operations, main flow of the process gas from the mainline 22 can pass on to a continuing mainline 28. The pigging system 30 includes a bypass or kick line 32 having a valve 34. The line 32 connects from the mainline 22 to a pig launcher 40, which includes a housing for pigs and includes various outlets, inlets, sensors, and the like. A pup joint 42 connected in line from the pig launcher 40 has a valve 44 and connects to the flow tee 26 for introducing pigs into the continuing mainline 28.

During pigging operations, the kick line 32 of the pigging system 30 feeds process gas to the launch barrel (volume 12) of the launcher 40 in which the pigs (not shown) are housed. The kicker valve 34 on the kick line 32 controls the feed of the process gas from the mainline 22 to the launcher 40. Once launched, the pig(s) pass along the pup line 42 to the continuing mainline 28 at the flow tee 26. The isolation valve 44 provided on this pup line 42 is open to allow communication of the pig(s). As will be appreciated, the pigging system 30 can include a number of additional components (not shown), such as pressurizing line, a drain line, a relief valve, a purge connection, a vent connection, a tell-tale valve, pig bars, gauges, etc.

After the pigging operations, the pig launcher 40 is isolated from the mainline 22, 28 by closing the valves 34, 44. This leaves high pressure process gas in the volume (12) of the pig launcher 40. To reclaim this process gas and reintroduce it into the piping system 20, operators connect the gas transfer system 50 between the pigging system 30 and the piping system 20. In general, the suction line 53 can be connected to an appropriate valve or outlet on the pig launcher 40, and the discharge line 57 can be likewise connected to an appropriate valve or inlet on the piping system 20.

When operated, the gas transfer system 50 begins moving gas from the source (12) to the destination (16). The compression stages (80) of the system 50 discharge the reclaimed gas at a pressure slightly greater than the pressure in the destination volume (16). The process continues until the pressure in the source volume (12) has decreased to a desired level. The pressure in the source volume (12) continually decreases during the process, while the pressure in designation volume (16) may or may not increase depending on the size of the destination volume (16). The process can be manually or automatically controlled. Therefore, a control unit or manual controls 59 may be provided on the unit 55.

Once the gas has been recaptured and discharged, the gas transfer system 50 can be turned off and disconnected for use elsewhere as needed. As will be appreciated, the system 50 can be comparably used for a pig receiver. A number of other uses include operations in which maintenance of transmission, distribution, or gathering lines is performed or in which trenchless rehabilitation is performed. Additionally, the system 50 can be used for hot tap tie-ins; line abandonment, repair, or replacement; process vessel maintenance; filter replacement; etc.

Figure 3:
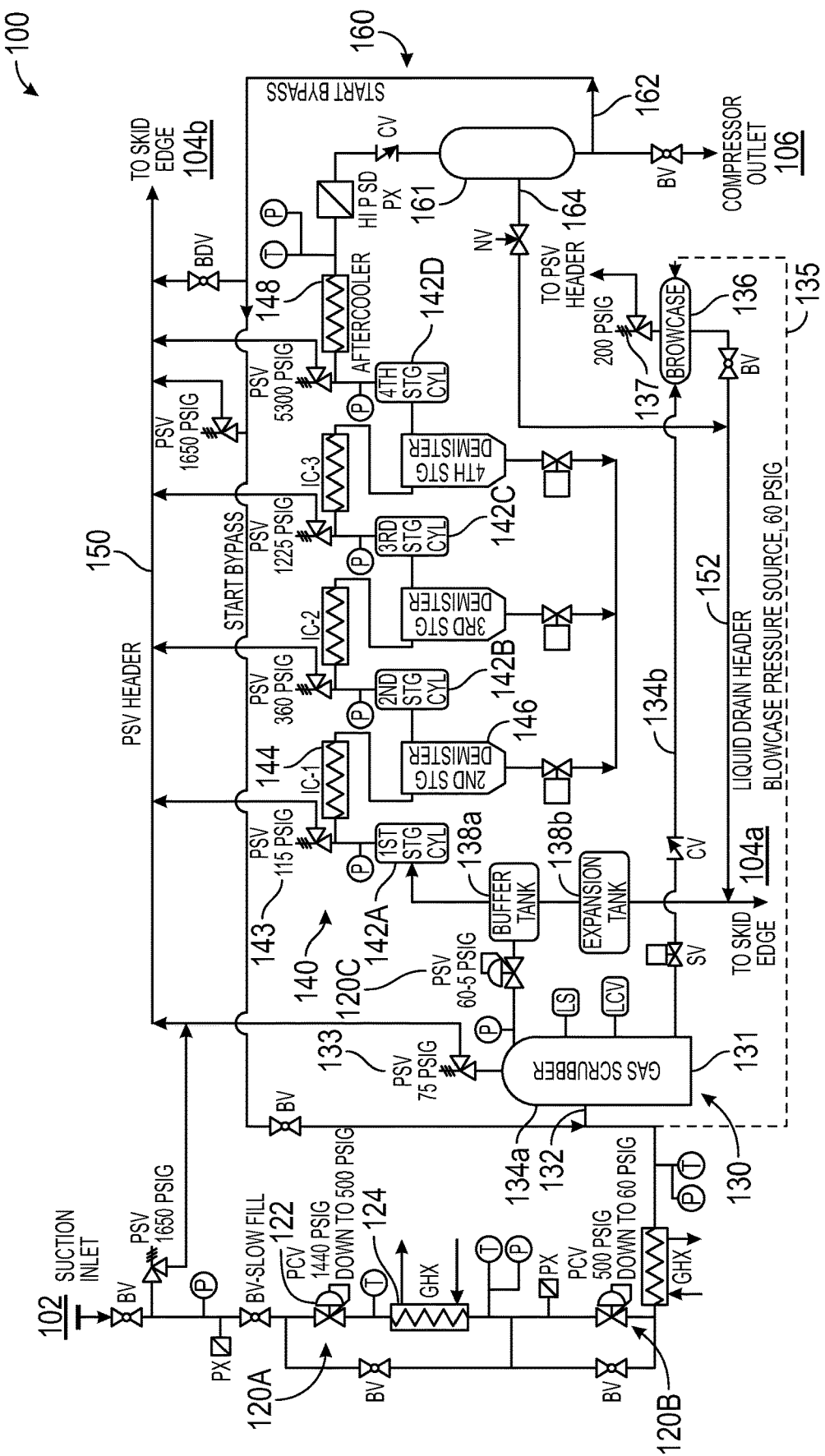
FIG. 3 illustrates an example configuration of a gas transfer system of the present disclosure in more detail.

FIG. 3 illustrate a schematic of one configuration of a gas transfer system 100 of the present disclosure in more detail. This particular configuration may be suited for pipeline operations, such as recovery of process gas from a pigging operation.

In the system 100, a suction inlet 102 connects to the source volume (12), and a compressor outlet 106 connects to the destination volume (16). Again, the source volume (12) can be a pig launcher/receiver, and the destination volume (16) can be part of the associated piping system. As before, the system 100 uses one or more decompression or regulation stages 120A-B to step down the inlet pressure from the source volume (12) to a low pressure. These stages 120A-B drop the pressure of the process gas and reheat the process gas thereafter. As discussed below, pressure regulating devices and heat exchangers are used in these stages 120A-B to regulate the pressure and temperature of the process gas.

After the pressure drop and reheating during the regulation stages 120A-B, the process gas enters a scrubbing stage 130, which has a scrubber 131, a blowcase 136, and tanks 138a-b. The scrubber 131, the blowcase 136, and the tanks 138A-B can collect liquid for delivery to a liquid drain header 152.

From the scrubbing stage 130, the process gas at the reduced pressure then undergoes one or more compression cycles 142A-D of a compression stage 140. In general, the compression stage 140 can be provided by a single stage compressor, a number of signal stage compressors connected in series, or a multistage compressor 140 or other compressor equipment. The compressor(s) for the stage 140 can be driven by an electric motor, engine, or the like. For its part, the engine can operate using any suitable and available fuel. The volumes (12, 16) can be at any pressure within the performance capability of the compressor 140.

The compression stage 140 increases the pressure of the process gas to a final pressure suited for outlet to the destination volume (16). Various pressure safety valves (PSV) of the gas transfer system 100 can connect to a pressure safety valve header 150 to expel gas that is at excess pressures for venting, flaring, or the like. Various bypass valves (BV), control valves (CV), temperature sensors, pressure sensors, and other equipment are used through the system 100 as discussed below. Eventually, the process gas at the final pressure can be discharged by the discharge stage 160 from the outlet 106.

The gas transfer system 100 commences when the compression cycles 142A-D of the compressor stage 140 are started and begin to withdraw gas, initially at high pressure, from the source (12) into the inlet 102. Because the gas is initially at high pressure, the gas is regulated down in one or two regulation steps of the regulation stages 120A-B using pressure regulators 122, which are properly sized for the pressures. Depending on the pressure drop associated with the pressure regulation, the gas temperature may decrease. In cases of significant pressure regulation, the gas temperature may decrease from ambient temperature to below 0° F. Therefore, a heat exchanger 124, such as an electric-to-gas heat exchanger or an engine coolant-to-gas heat exchanger, can be utilized to increase the process gas temperature into a range suitable for the next step of pressure regulation (if necessary), or suitable for the compressor inlet. Bypass valves (BV) can be provided on bypass lines to circumvent the pressure regulators 122 when the pressure in the source (12) or the pressure between pressure regulation stages 120A-B decreases to an acceptable level. Various types of pressure regulators 122 can be used to produce the pressure drop.

Looking more closely in this example, the suction inlet 102 communicates process gas to one or more regulation stages 120A-B, each having a pressure control valve 122a-b and a heat exchanger 124a-b. As shown in this example, a first regulation stage 120A has a first pressure control valve 122a and has a first heat exchanger 124a to provide a first stage of regulation and reheating, and a second regulation stage 120B has a second pressure control valve 122b and a second heat exchanger 124b to provide a second stage of regulation and reheating. A number of pressure control valves 122*a-b* can be used, such as valves for high pressure relief, unloading, and decompression.

Pressure and temperatures sensors (P & T) can be used to monitor the pressure regulation and reheating in the stages 120A-B. For example, a temperature sensor (T) can measure the temperature of the gas after the respective pressure control valve 122*a-b* to determine what heating may be needed for the gas by the heat exchanger 124*a-b* after the pressure regulation. Additionally, a temperature sensor (T) can also measure the temperature after the respective heat exchanger 124*a-b* to verify the temperature of the gas after heating. Moreover, pressure sensors (P) can measure the pressure of the gas before and after regulation to determine that a correct pressure has been reached and to determine whether any further regulation is needed depending on the circumstances.

As will be appreciated, one or more of the regulation stages 120A-B can be used by operating various bypass valves (BV) on bypass lines to meet the requirements of an implementation. In one particular configuration, the first regulation stage 120A can be configured to drop input pressure of 1440-psig down to 500-psig, and a second regulation stage 120B can be configured to drop input pressure of 500-psig down to 60-psig. The various bypass valves (BV) can be controlled to isolate one or more of the regulation stages 120A-B. The heater exchangers 124*a-b* can be electric-to-gas heat exchangers, although other types of heat exchangers can be used.

After the pressure regulation and reheating in the stages 120A-B, the gas having been heated enters the scrubbing stage 130 where any liquids are collected. These liquids may gravitationally drop out or may be removed by a vane pack, mist extractor, or any other suitable scrubbing arrangement. As shown here, the process gas enters an inlet 132 of the gas scrubber 131. In general, the gas scrubber 131 can be a vessel to remove traces of liquid from the process gas that may have condensed in the process gas so that liquid is kept from the compression stages 142A-D of the compressor 140. Various sensors, such as level sensor or switch (LS) and level control valve (LCV), measure and regulate the liquid dropped out of the process gas in the scrubber 131.

The liquid from the vessel 131 can be fed by a liquid line 134*b* having a safety valve (SV) and control valve (CV) to a blowcase 136. The blowcase 136 is used for collecting the gravity fed liquid at low pressure from the gas scrubber 131, and the higher pressure of the process gas from the blowcase pressure source 135 is used to boost the liquid to the liquid drain header 152 without the need for pumping.

The blowcase 136 can have a pressure safety valve 137, which connects to a pressure safety valve header 150 of the system 100—to which a number of other pressure safety valves of the system 100 also connect. For instance, the scrubber 131 can also have a pressure safety valve 133 that connects to the header 150 for venting to a gas outlet 104*b* at a skid's edge.

The blowcase 136 also connects to a liquid drain header 152 using a bypass valve (BV). The liquid drain header 152 can connect to a liquid outlet 104*a* at the skid's edge. For the blowcase 136 to function, a source pressure (i.e., 60-psig) can be provided to the blowcase 136 by the process gas from tubing for the blowcase pressure source 135 connected to the output of the regulation stages 120A-B.

At a gas outlet 134*a* of the gas scrubber 131, the process gas passes a pressure sensor (P) to an additional pressure control valve (PCV) 120C that can further regulate the pressure down, such as from 60-psig to 5-psig. A buffer tank 138*a* receives this low pressure process gas, and an expansion tank 138*b* connected to the buffer tank 138*a* can be used to collect any liquid from the low pressure process gas for passage to the liquid drain header 152 of the system 100. The system 100 is expected to produce only small amounts of liquid drop out.

The process gas, now appreciably void of liquid droplets and at an appropriately controlled temperature and pressure, enters and traverses through the one or more compression cycles 142A-D of the compression stage 140, which can be part of a single-stage or a multi-stage compressor. For example, a continuous duty direct-drive booster compressor with gas conditioning system can be used for the stage 140.

From the buffer tank 138*a*, for example, the low pressure process gas can pass to the one or more compression stage cycles 142A-D provided by the compressor of the stage 140 of the system 100. In this example, four compression stage cycles 142A-D are shown, but more or fewer can be used depending on the implementation. Each compression stage cycle 142A-D increases the pressure of the fed gas by an increasing step-up, and a pressure sensor (P) measures the increased pressure of the gas after compression. A pressure safety valve (PSV) 143 can be provided to discharge gas over a defined pressure to the pressure safety valve header 150. Each cycle 142A-D can be set at increasing pressure thresholds to protect the subsequent cycle 142A-D.

Because the compression of the process gas increases its temperature, an intercooler heat exchanger 144 after the compression stage cycle 142A-D cools the gas before the gas enters into a scrubber or demister stage 146. In the demister stage 146, any lubricant oil for the compressor 140 contained in the process gas can be collected at coalescing filters. Additional compression stage cycles 142B-D can follow the first cycle 142A as needed, and each can be followed by a pressure control valve 143, an intercooler 144, and a demister stage 146.

In the present example, four compression stage cycles 142A-D are shown, with pressure safety valves 143 of increasing pressure ratings, such as 115-psig, 360-psig, 1225-psig, and 5300-psig. Other pressure values can be used depending on the implementation. A final aftercooler 148 can be provided after the last stage cycle 142D. Temperature and pressure sensors monitor the process gas, which then passes to a discharge vessel 161 of the discharge stage 160. A high-pressure shutdown device (SD) and control valve (CV) can be used in the feed of the process gas to the discharge vessel 161.

Any liquid can be discharged to the liquid drain header 152 via a line 164 having a needle valve (NV). A feed 162 can be provided from the discharge vessel 161 to the outlet of the regulation stages 120A-B at a junction before the scrubbing stage 130 for a start bypass. During operation, the start bypass can open during start-up and can open for a short interval (5-sec) every hour or so. This allows the scrubber/demister equipment (e.g., 131, 136, 146) to open for the short interval to dump liquid. Ultimately, the process gas from the discharge vessel 161 can pass to the system outlet 106, which is connected to the destination volume for the process gas.

Figure 4:
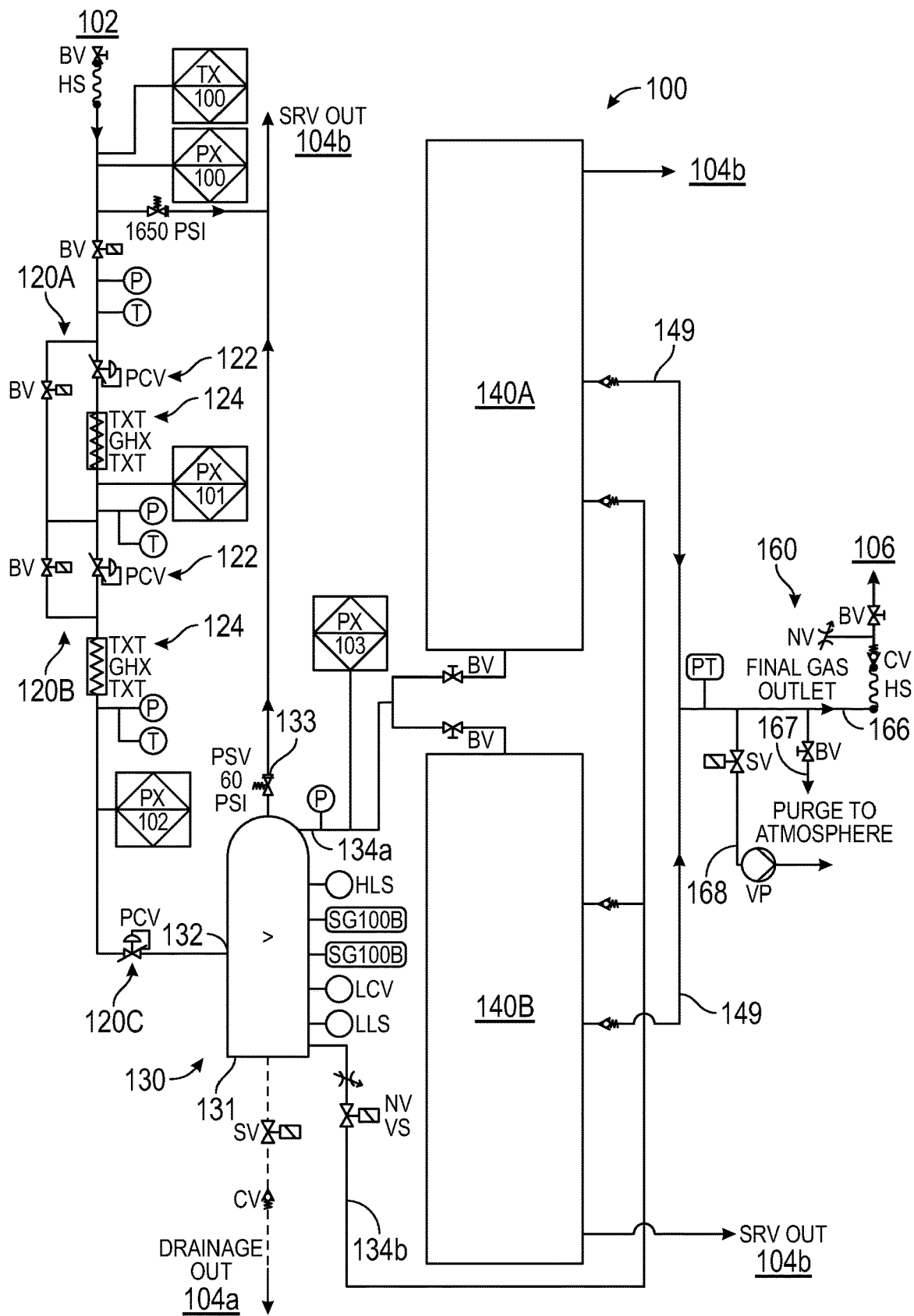
FIG. 4 illustrates another configuration of a gas transfer system of the present disclosure in more detail.

As noted above, certain features of the scrubbing stage 130 and discharge stage 160 may or may not be used or necessary depending on the implementation. FIG. 4 illustrate a schematic of another configuration of a gas transfer system 100 of the present disclosure in more detail. This particular configuration may also be suited for pipeline operations, such as recovery of gas from a pigging operation. In contrast to the previous configuration, this system 100 may lack buffer and expansion tanks (138*a-b*), a blowcase (136), and a discharge tank (161). Moreover, the system 100 may further include redundant or parallel compression stages 140A-B. Similar reference numerals of the system 100 in FIG. 4 are used for comparable components of the system 100 in FIG. 3.

In the system 100, a suction inlet 102 connects to the source volume (12), and a compressor outlet 106 connects to the destination volume (16). Again, the source volume (12) can be a pig launcher/receiver, and the destination volume (16) can be part of the associated piping system. As before, the system 100 uses one or more decompression or regulation stages 120A-B to step down the inlet pressure from the source volume (12) to a low pressure. These stages 120A-B drop the pressure of the process gas and reheats the process gas thereafter. As discussed below, pressure regulating devices and heat exchangers are used in these stages 120A-B to regulate the pressure and temperature of the process gas.

After the pressure drop and reheating during the regulation stages 120A-B, the process gas enters the scrubbing stage 130, which has a scrubber 131 to collect liquid for delivery to a liquid drain header 152.

Figure 5:
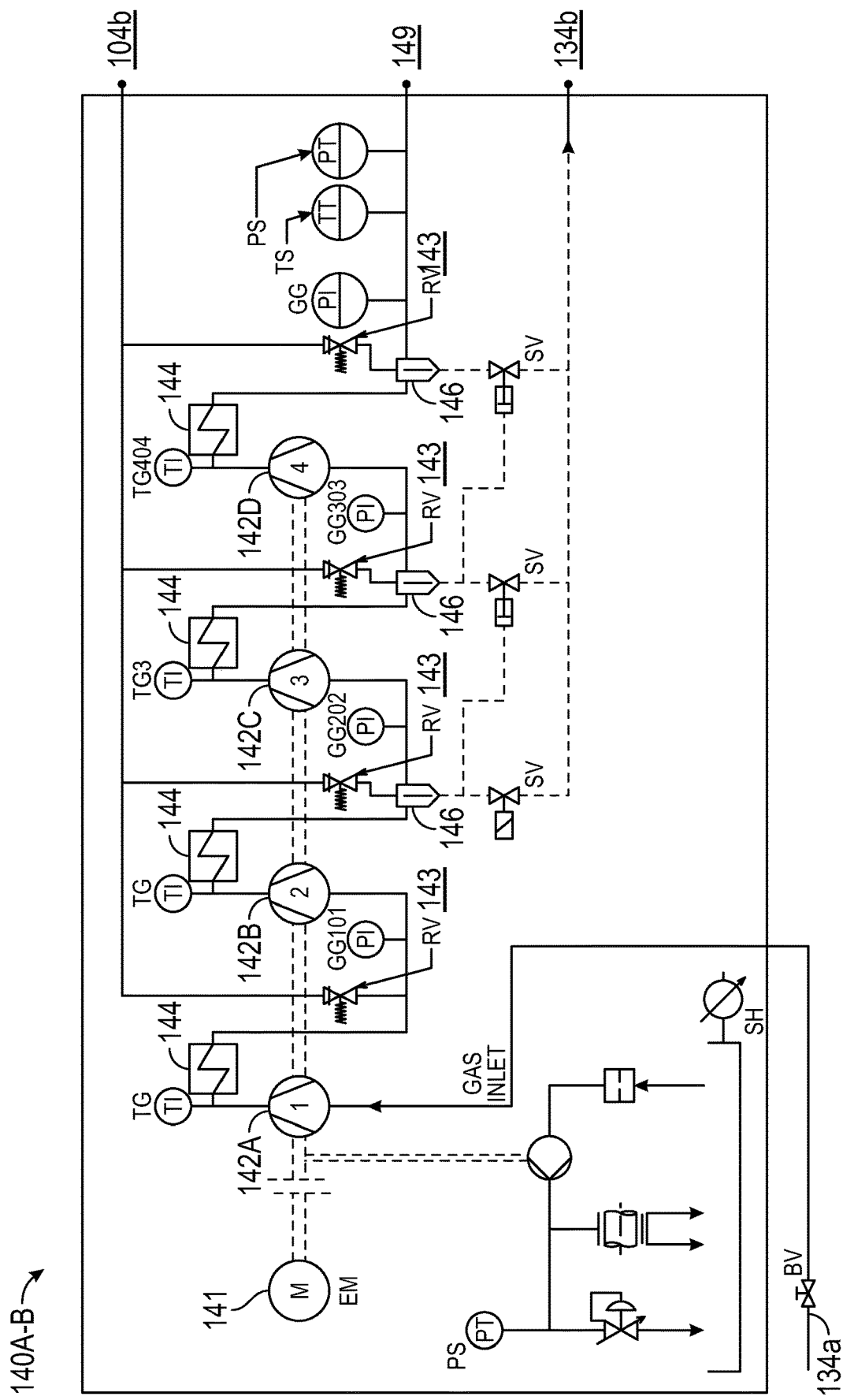
FIG. 5 illustrates a detail of a compression stage for the system in FIG. 4.

From the scrubbing stage 130, the process gas at the reduced pressure then undergoes compression using one or both redundant compression stages 140A-B. Each of the compression stages 140A-B can use a multistage compressor, and the two multistage compressors of the stages 140A-B can be connected in parallel to provide redundant or alternate capacity for the system 100. Further details of the compression stages 140A-B are shown in FIG. 5, which illustrates the components of one of these stages 140A-B used in the system 100. The volumes (12, 16) can be at any pressure within the performance capability of the compression stages 140A-B.

As before, the compression stages 140A-B increase the pressure of the process gas to a final pressure suited for outlet to the destination volume (16). Various pressure safety valves (PSV) of the system 100 can connect to a pressure safety valve header 150 to expel gas that is at excess pressures for venting, flaring, or the like. Various bypass valves (BV), control valves (CV), temperature sensors, pressure sensors, and other equipment are used through the system 100 as discussed below. Eventually, the process gas from gas lines 149 at the final pressure can be discharged by the discharge stage 160 from the outlet 106.

As before, the gas transfer system 100 commences when the compression cycles of one or both the compression stages 140A-B are started and begin to withdraw gas, initially at high pressure, from the source (12) into the inlet 102. Because the gas is initially at high pressure, the gas is regulated down in one or two regulation steps of the regulation stages 120A-B using pressure regulators 122, which are properly sized for the pressures. Depending on the pressure drop associated with the pressure regulation, the gas temperature may decrease. In cases of significant pressure regulation, the gas temperature may decrease from ambient temperature to below 0° F. Therefore, a heat exchanger 124, such as an electric-to-gas heat exchanger or an engine coolant-to-gas heat exchanger, can be utilized to increase the process gas temperature into a range suitable for the next step of pressure regulation (if necessary), or suitable for the compressor inlet. Bypass valves (BV) can be provided on bypass lines to circumvent the pressure regulators 122 when the pressure in the source (12) or the pressure between pressure regulation stages 120A-B decreases to an acceptable level. Various types of pressure regulators 122 can be used to produce the pressure drop.

Looking more closely in this example, the suction inlet 102 communicates process gas to one or more regulation stages 120A-B, each having a pressure control valve 122a-b and a heat exchanger 124a-b. As shown in this example, a first regulation stage 120A has a first pressure control valve 122a and has a first heat exchanger 124a to provide a first stage of regulation and reheating, and a second regulation stage 120B has a second pressure control valve 122b and a second heat exchanger 124b to provide a second stage of regulation and reheating. A number of pressure control valves 122a-b can be used, such as valves for high pressure relief, unloading, and decompression.

Pressure and temperatures sensors (P & T) can be used to monitor the pressure regulation and reheating in the stages 120A-B. For example, a temperature sensor (T) can measure the temperature of the gas after the respective pressure control valve 122a-b to determine what heating may be needed for the gas by the heat exchanger 124a-b after the pressure regulation. Additionally, a temperature sensor (T) can also measure the temperature after the respective heat exchanger 124a-b to verify the temperature of the gas after heating. Moreover, pressure sensors (P) can measure the pressure of the gas before and after regulation to determine that a correct pressure has been reached and to determine whether any further regulation is needed depending on the circumstances.

As will be appreciated, one or more of the regulation stages 120A-B can be used by operating various bypass valves (BV) on bypass lines to meet the requirements of an implementation. In one particular configuration, the first regulation stage 120A can be configured to drop input pressure of 1440-psig down to 500-psig, and a second regulation stage 120B can be configured to drop input pressure of 500-psig down to 60-psig. The various bypass valves (BV) can be controlled to isolate one or more of the regulation stages 120A-B. The heater exchangers 124a-b can be electric-to-gas heat exchangers, although other types of heat exchangers can be used.

After the pressure regulation and reheating in the stages 120A-B, the gas having been heated can pass through a final pressure control valve 120C to regulate the pressure down a final step, such as from 60-psig to 5-psig. The low pressure gas then enters the scrubbing stage 130 where any liquids are collected. These liquids may gravitationally drop out or may be removed by a vane pack, mist extractor, or any other suitable scrubbing arrangement. As shown here, from the pressure control valve 120C, the process gas enters an inlet 132 of the scrubber 131. The gas scrubber 131 can be a vessel to remove traces of liquid from the process gas that may have condensed in the process gas so that liquid is kept from the compression stages of the compressors 140A-B. Various sensors, such as level sensor or switch (LS) and level control valve (LCV), measure and regulate the liquid dropped out of the process gas in the scrubber 131.

The liquid from the scrubber 131 can be fed by a liquid line 134b having a safety valve (SV) and control valve (CV) to a liquid outlet 140a. Throughout the system 100, various pressure safety valves can connect to a pressure safety valve header and outlet 104b of the system 100. For instance, the scrubber 131 can also have a pressure safety valve 133 that can vent to the gas outlet 104b at the skid's edge.

At a gas outlet 134a of the scrubber 131, the process gas passes a pressure sensor (P). At this point, the pressure of the gas has been regulated down to a suitably low pressure, such as 5-psig. The process gas, now appreciably void of liquid droplets and at an appropriately controlled temperature and pressure, is communicated to one or both of the compression stages 140A-B. Bypass valves can be used to open or close gas flow to the compressors 140A-B depending on the required capacity. The gas enters and traverses through the one or more compression cycles 142A-D in the given compression stage 140A-B. For example, a continuous duty direct-drive booster compressor in the stages 140A-B with gas conditioning system can be used.

FIG. 5 illustrates a detail of compression stage cycles 142A-D provided by a given one of the compression 140A-B of the system 100. In this example, four compression stage cycles 142A-D are shown, but more or fewer can be used depending on the implementation. As shown, the cycles 142A-D in the compression stage 140A-B can be driven by an electric motor 14,1 although any other prime mover or engine can be used. In the system 100 of FIG. 3, both compressors 140A-B can include comparable configurations as that shown in FIG. 5.

As shown in FIG. 5, each compression stage cycle 142A-D increases the pressure of the fed gas by an increasing step-up, and a pressure sensor (P) measures the increased pressure of the gas after compression. A relief valve (RV) 143 can be provided to discharge gas over a defined pressure to the relief outlet 104b. Each cycle 142A-D can be set at increasing pressure thresholds to protect the subsequent cycle 142A-D.

Because the compression of the gas increases its temperature, an intercooler heat exchanger 144 after the compression stage cycle 142A-D cools the gas before the gas enters into a scrubber or demister stage 146. In the demister stage 146, any lubricant oil for the compressor 140 contained in the process gas can be collected at coalescing filters. Additional compression stage cycles 142B-D can follow the first cycle 142A as needed, and each can be followed by a relief valve 143, an intercooler 144, and a demister stage 146.

In the present example, four compression stage cycles 142A-D are shown, with relief valves 143 of increasing pressure ratings, such as 116-psig, 363-psig, 1450-psig, and 1650-psig as on example. Other pressure values can be used depending on the implementation. After the final aftercooler 144 of the last stage cycle 142D, temperature and pressure sensors monitor the process gas, which then passes to the discharge stage 160.

Returning to FIG. 4, the process gas at the increase pressure from the gas lines 149 enters the discharge stage 160. Rather than including a vessel, the discharge stage 160 includes a final gas outlet that can connect to a line 166 having a control valve (CV), a needle valve (NV), and a bypass valve (BV). Another line 167 may be a purge line having a bypass valve (BV) to purge to atmosphere. Additionally, a third line 168 can include a safety valve (SV) and a general pump (VP) for additional uses as necessary. Ultimately, the process gas from the discharge stage 160 can pass to the system outlet 106, which is connected to the destination volume for the process gas.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A system for recovering a process gas from a first volume at a first pressure to a second volume at a second pressure, the system comprising:

one or more regulation stages receiving the process gas from the first volume at the first pressure and configured to step down the first pressure to an intermediate pressure, each of the one or more regulation stages comprising a pressure control valve to step-down pressure of the process gas;

a gas scrubbing stage receiving the process gas from the one or more regulation stages and collecting liquid from the process gas;

one or more compression stages receiving the process gas from the gas scrubbing stage and configured to step up the intermediate pressure to a final pressure, each of the one or more compression stages comprising a compression cycle to step-up pressure and comprises a heat exchanger to cool the process gas thereafter; and a discharge stage receiving the process gas from the one or more compression stages and configured to discharge the process gas at the final pressure to the second volume at the second pressure, the final pressure being equal to or greater than the second pressure, wherein each of the one or more compression stages comprises:

a pressure safety valve disposed upstream or downstream of a scrubber and configured to release the process gas above a pressure threshold to a gas outlet, the pressure threshold for each of the one or more compression stages increasing from one of the compression cycles to the next.

2. The system of claim 1, wherein the pressure control valve for the pressure step-down increases from one of the regulation stage to the next.

3. The system of claim 1, comprising a plurality of the one or more regulation stages separably connected by bypass valves.

4. The system of claim 1, wherein the scrubber has:
   an inlet configured to receive the process gas from the one or more regulation stages;
   a liquid outlet configured to drain the liquid;
   a gas outlet configured to output the process gas.

5. The system of claim 1, further comprising a blowcase connected to the gas scrubbing stage and receiving the collected liquid, the blowcase connected to source pressure boosting the liquid to a liquid outlet.

6. The system of claim 5, wherein the intermediate pressure from the one or more regulation stages provides the source pressure for the blowcase.

7. The system of claim 1, further comprising one or more tanks buffering expansion of the process gas from the gas scrubbing stage and draining liquid therefrom to a liquid outlet.

8. The system of claim 1, the system directed to recover the process gas from a pigging vessel for the first volume to a pipeline element as the second volume, the system further comprising: a suction inlet configured to connect to the pigging vessel; a compressor outlet configured to connect to the pipeline element; a liquid outlet configured to drain the liquid;
   and a gas outlet configured to vent any of the process gas exceeding one or more pressure thresholds in the system.

9. The system of claim 1, wherein the discharge stage comprises a discharge vessel collecting the process gas from the one or more compression stages, the discharge vessel having a gas outlet configured to connect to the second volume and having a liquid outlet configured to drain any liquid from the vessel.

10. The system of claim 1, further comprising a bypass line connected from the discharge stage to upstream of the gas scrubbing stage, the bypass line bypassing some of the process gas from the discharge stage to the gas scrubbing stage and configured to prime the liquid discharge.

11. The system of claim 1, wherein the discharge stage comprises a gas outlet line, a purge-to-atmosphere line, and a line connect to a pump.

12. The system of claim 1, comprising a plurality of the one or more compression stages implemented by a plurality of single stage compressors connected in series to the gas scrubbing stage, implemented by one or more multistage compressors connected in series to the gas scrubbing stage, or multistage compressors connected in parallel to the gas scrubbing stage.

13. A system for recovering a process gas from a first volume at a first pressure to a second volume at a second pressure, the system comprising:
one or more regulation stages receiving the process gas from the first volume at the first pressure and configured to step down the first pressure to an intermediate pressure, each of the one or more regulation stages comprising a pressure control valve to step-down pressure of the process gas and comprising a heat exchanger to heat the process gas thereafter;
a gas scrubbing stage receiving the process gas from the one or more regulation stages and collecting liquid from the process gas;
one or more compression stages receiving the process gas from the gas scrubbing stage and configured to step up the intermediate pressure to a final pressure, each of the one or more compression stages comprising a compression cycle to step-up pressure and comprises a heat exchanger to cool the process gas thereafter; and
a discharge stage receiving the process gas from the one or more compression stages and configured to discharge the process gas at the final pressure to the second volume at the second pressure, the final pressure being equal to or greater than the second pressure,
wherein the system comprises an intermediate pressure control valve connected between the gas scrubbing stage and the one or more compression stages or connected between the one or more regulation stages and the gas scrubbing stage, the intermediate pressure control valve being configured to step-down the intermediate pressure to a lower pressure.

14. A method to recover a process gas from a first volume at a first pressure to a second volume at a second pressure, the method comprising:
receiving the process gas from the first volume at the first pressure;
bringing the process gas down from the first pressure to an intermediate stage pressure below the first pressure by stepping the process gas down from the first pressure through one or more pressure control valves and reheating the process gas after being stepped down;
scrubbing liquid from the stepped-down process gas;
bringing the processes gas up from the intermediate staged pressure to a final staged pressure by stepping the process gas up through one or more compression cycles and cooling the process gas after being compressed; and
discharging the process gas at the final staged pressure to the second volume, the final staged pressure being equal to or greater than the second pressure,
wherein bringing the processes gas down from the first pressure to the intermediate staged pressure below the first pressure comprises measuring a first temperature of the process gas after being stepped down, reheating the process gas with a heat exchanger based on the first temperature; measuring a second temperature of the process gas after reheating; and verifying the reheating of the process gas based on a comparison between the first and second temperatures.

15. The method of claim 14, wherein scrubbing the liquid from the process gas at the intermediate staged pressure comprises: communicating the liquid to a blowcase; boosting the liquid from the blowcase using the process gas as a source pressure; and draining the boosted liquid from a liquid outlet.

16. The method of claim 14, comprising stepping the process gas down through an additional pressure control valve before or after scrubbing.

17. The method of claim 16, wherein stepping the process gas down through the additional pressure control valve after scrubbing comprises stepping the process gas down through the additional pressure control valve disposed between a scrubber and one or more buffer tanks.

18. The method of claim 14, wherein scrubbing the process gas comprises buffering expansion of the process gas in one or more buffer tanks; and draining liquid from the buffered process gas.

19. The method of claim 14, wherein bringing the processes gas up from the intermediate staged pressure to the final staged pressure by stepping the process gas up through one or more compression cycles and cooling the process gas after being compressed comprises: compressing the process gas in a first of the one or more compression cycles; measuring a first staged pressure of the process gas after compression; expelling the process gas above a first pressure threshold; cooling the process gas with an intercooler; and
compressing the process gas in at least one subsequent of the one or more compression cycles; measuring a subsequent staged pressure of the process gas after compression; expelling any of the process gas above a subsequent pressure threshold; and cooling the process gas with an intercooler.

20. The method of claim 19, wherein expelling the process gas above the first and second pressure thresholds is done either upstream or downstream of the respective intercooler.

21. The method of claim 19, wherein compressing the process gas comprises demisting the process gas of lubricant oil after cooling.

22. The method of claim 14, wherein discharging the process gas at the final staged pressure to the second volume comprises collecting the process gas in a discharge vessel; and draining any liquid from the process gas.

23. The method of claim 22, wherein discharging the process gas at the final staged pressure to the second volume comprises bypassing at least some of the process gas from the discharge vessel to a scrubber to prime the liquid discharge.

24. The method of claim 14, wherein receiving the process gas from the first volume at the first pressure comprises connecting a suction inlet to the first volume; wherein discharging the process gas comprises a compressor outlet to the second volume; and wherein the method further comprises: draining the liquid from a liquid outlet; and venting any of the process gas exceeding one or more pressure thresholds from a gas outlet.

25. The method of claim 14, wherein the method is directed to recover the process gas from a pigging vessel for the first volume to a pipeline element as the second volume, the method further comprising:
- connecting an inlet in communication with the pigging vessel; and
- connecting an outlet in communication with the pipeline element.

26. A method to recover a process gas from a first volume at a first pressure to a second volume at a second pressure, the method comprising:
- receiving the process gas from the first volume at the first pressure;
- bringing the process gas down from the first pressure to an intermediate stage pressure below the first pressure by stepping the process gas down from the first pressure through one or more pressure control valves and reheating the process gas after being stepped down;
- scrubbing liquid from the stepped-down process gas;
- bringing the processes gas up from the intermediate staged pressure to a final staged pressure by stepping the process gas up through one or more compression cycles and cooling the process gas after being compressed; and
- discharging the process gas at the final staged pressure to the second volume, the final staged pressure being equal to or greater than the second pressure,
- wherein bringing the processes gas down from the first pressure to the intermediate staged pressure below the first pressure comprises measuring a first pressure of the process gas before being stepped down; measuring a second pressure of the process gas after being stepped down; and verifying the stepdown of the process gas based a comparison between the first and second pressures.

27. A system for recovering a process gas from a first volume at a first pressure to a second volume at a second pressure, the system comprising:
- one or more regulation stages receiving the process gas from the first volume at the first pressure and configured to step down the first pressure to an intermediate pressure, each of the one or more regulation stages comprising a pressure control valve to step-down pressure of the process gas and comprising a heat exchanger to heat the process gas thereafter;
- a gas scrubbing stage receiving the process gas from the one or more regulation stages and collecting liquid from the process gas;
- one or more compression stages receiving the process gas from the gas scrubbing stage and configured to step up the intermediate pressure to a final pressure, each of the one or more compression stages comprising a compression cycle to step-up pressure; and
- a discharge stage receiving the process gas from the one or more compression stages and configured to discharge the process gas at the final pressure to the second volume at the second pressure, the final pressure being equal to or greater than the second pressure,
- wherein the system comprises an intermediate pressure control valve connected between the gas scrubbing stage and the one or more compression stages or connected between the one or more regulation stages and the gas scrubbing stage, the intermediate pressure control valve being configured to step-down the intermediate pressure to a lower pressure.

28. The system of claim 27, wherein the pressure control valve for the pressure step-down increases from one of the regulation stage to the next.

29. The system of claim 27, wherein the heat exchanger comprises an electric-to-gas heat exchanger or an engine coolant-to-gas heat exchanger.

30. The system of claim 27, wherein each of the one or more compression stages comprises a demister disposed downstream of the heat exchanger and configured to remove lubricant oil from the process gas.

* * * * *